US012101392B2

United States Patent
Yan et al.

(10) Patent No.: US 12,101,392 B2
(45) Date of Patent: Sep. 24, 2024

(54) COHERENT DETECTION-BASED HIGH-SPEED CHAOTIC SECURE TRANSMISSION METHOD

(71) Applicant: Southwest Jiaotong University, Chengdu (CN)

(72) Inventors: Lianshan Yan, Chengdu (CN); Lin Jiang, Chengdu (CN); Yan Pan, Chengdu (CN); Anlin Yi, Chengdu (CN); Wei Pan, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 258 days.

(21) Appl. No.: 17/518,650

(22) Filed: Nov. 4, 2021

(65) Prior Publication Data
US 2022/0140994 A1    May 5, 2022

(30) Foreign Application Priority Data
Nov. 4, 2020 (CN) .......................... 202011215059.4

(51) Int. Cl.
*H04L 9/00* (2022.01)
*H04L 9/08* (2006.01)
(Continued)

(52) U.S. Cl.
CPC ............ *H04L 9/001* (2013.01); *H04L 9/0858* (2013.01); *H04L 9/3066* (2013.01); *H04L 27/1525* (2013.01)

(58) Field of Classification Search
CPC .............................. H04L 9/001; H04L 9/0858
See application file for complete search history.

(56) References Cited

U.S. PATENT DOCUMENTS

| 6,018,582 A * | 1/2000 | Francois ................. H04L 9/001 380/263 |
| 8,538,272 B1 * | 9/2013 | Robinson ........... H04B 10/2513 398/187 |

(Continued)

FOREIGN PATENT DOCUMENTS

| CN | 111245595 A | 6/2020 |
| CN | 111277337 A | 6/2020 |

OTHER PUBLICATIONS

Longsheng Wang, et. al., Scheme of coherent optical chaos communication, Optics Letters, 2020, pp. 4762-4765, vol. 45, No. 17.
Mao, Shuai, et al., Coherent reception technology based on DSP in 100 Gbit /s DP-QPSK system, Laser & Infrared, Dec. 2013, pp. 1393-1396, vol. 43, No. 12.
Apostolos Argyris, et. al., Chaos-based communications at high bit rates using commercial fibre-optic links, Nature, Nov. 17, 2005, pp. 343-346, vol. 438.

(Continued)

*Primary Examiner* — Daniel B Potratz
(74) *Attorney, Agent, or Firm* — Bayramoglu Law Offices LLC (57) ABSTRACT

A coherent detection-based high-speed chaotic secure transmission method includes: at a transmit terminal in a chaotic secure transmission system, optically coupling an optical chaotic carrier and transmission information by using an orthogonal basis to mask the transmission information by using a noise-like feature of the chaotic carrier, so as to obtain a chaotic masked signal; adding a fast phase disturbance and a fast polarization disturbance to the chaotic masked signal and transmitting the chaotic masked signal over an optical fiber transmission link; and at a receive terminal, obtaining the chaotic masked signal through coherent detection, compensating the chaotic masked signal for linear and nonlinear effects through digital signal processing, and using a polarization orthogonal basis- or phase orthogonal basis-based chaotic decryption algorithm to separate the chaotic carrier from the signal so as to complete decryption.

1 Claim, 5 Drawing Sheets

(51) Int. Cl.
*H04L 9/30* (2006.01)
*H04L 27/152* (2006.01)

(56) References Cited

U.S. PATENT DOCUMENTS

| 8,644,362 | B1* | 2/2014 | Lauer | H04B 1/707 |
| | | | | 375/141 |
| 2011/0222584 | A1 | 9/2011 | Michaels | |
| 2020/0162172 | A1* | 5/2020 | Sridhar | H04L 27/12 |
| 2020/0366539 | A1* | 11/2020 | Ren | H04L 27/38 |

OTHER PUBLICATIONS

Jianzhou AI, et. al., Secure communications of CAP-4 and OOK signals over MMF based on electro-optic chaos, Optics Letters, Sep. 15, 2017, pp. 3662-3665, vol. 42, No. 18.

Junxiang Ke, et. al., Chaotic optical communications over 100-km fiber transmission at 30-GB/s bit rate, Optics etters, Mar. 15, 2018, pp. 1323-1326, vol. 43, No. 6.

N. Gastaud, et. al., Electro-optical chaos for multi-10 Gbit/s optical transmissions, Electronics Letters, 2004, vol. 40, No. 14.

Roman Lavrov, et. al., Nonlocal Nonlinear Electro-Optic Phase Dynamics Demonstrating 10 GB/s Chaos Communications, IEEE Journal of Quantum Electronics, Oct. 2010, pp. 1430-1435, vol. 46, No. 10.

* cited by examiner

COHERENT DETECTION-BASED HIGH-SPEED CHAOTIC SECURE TRANSMISSION METHOD

CROSS REFERENCE TO THE RELATED APPLICATIONS

This application is based upon and claims priority to Chinese Patent Application No. 202011215059.4 filed on Nov. 4, 2020, the entire contents of which are incorporated herein by reference.

TECHNICAL FIELD

The present disclosure belongs to the field of secure communication transmission, and in particular, relates to a coherent detection-based high-speed chaotic secure transmission method.

BACKGROUND

In recent years, since various multimedia data services (such as big data, cloud computing, Internet of Things, machine-to-machine communication, and remote surgery) rapidly develop, people's demand for transmission capacity is continuously increasing, and global network traffic has explosively grown in the past decade. Due to the characteristics of high bandwidth and anti-electromagnetic interference, fiber optic communication is gradually replacing copper cables and is widely used in communication data transmission in modern society. However, the diversity of application scenarios of optical fiber transmission networks may increase the risk of message eavesdropping or interception in the transmission network. Therefore, at present, researchers usually use quantum key distribution or a chaotic encryption mechanism to protect transmission messages from being eavesdropped or intercepted, so as to implement secure communication transmission. Quantum key distribution can realize unconditionally secure key distribution, but this method is difficult to be compatible with high-speed optical communication systems. In contrast, secure communication based on the chaotic encryption mechanism masks or hides transmission information through hardware encryption, and has been verified in various high-speed transmission systems. Therefore, chaotic secure communication is regarded as the most potential solution for secure communication.

In a chaotic secure communication system, according to the nonlinear dynamics of a laser or a modulator, an optical chaotic carrier is generated through all-optical feedback or optoelectronic feedback. The nonlinear dynamics of the modulator is used to construct an optoelectronic feedback oscillation ring, so as to generate a chaotic carrier, which has received extensive attention from the researchers. Bandwidth generated by this method is limited only by bandwidth of an electronic device. Furthermore, this method can flexibly adjust optoelectronic oscillation delay, feedback intensity, and filter parameters can be, and can generate a high-dimensional chaotic carrier. In 2004, N. Gastaud et al. reported back-to-back transmission of 3 Gbit/s chaotic secure communication and achieved relatively good chaotic decoding quality. In 2005, A. Argyris et al. successfully demonstrated transmission of 2.4 Gbit/s chaotic secure communication over a 120 km standard single-mode fiber in the Athens metropolitan area network, Greece, and successfully decrypted a chaotic masked signal. In 2010, R. Lavrov et al. conducted transmission of 10 Gbit/s chaotic secure communication over a 120 km standard single-mode fiber in Besancon, France. In 2017, J. Ai et al. reported a series of laboratory experiments of transmission of 5 Gbit/s carrier-less amplitude and phase (CAP) chaotic secure communication and 10 Gbit/s on-off key (OOK) chaotic secure communication over a 2.6 km multimode fiber. In 2018, J. Ke et al. successfully verified transmission of 30 Gbit/s chaotic secure communication over a 100 km standard single-mode fiber. Subsequently, the team further used deep learning to synchronize and decrypt a chaotic masked signal transmitted in 32 Gbit/s chaotic secure communication over 20 km. These tests based on the optoelectronic feedback brighten the prospect of practical applications of secure communication transmission. To further improve the transmission rate and transmission distance of the chaotic secure communication system, the study of a coherent detection-based high-speed chaotic secure transmission system has important research significance.

SUMMARY

The present disclosure provides a method applicable to a high-speed secure communication transmission system with a plurality of transmission services, transmission wavelengths, fiber cores, and modes. In combination with a digital signal processing technology, a new chaotic masking method and a receiving method at a receive terminal are adopted to implement high-speed and long-distance transmission and decryption of chaotic secure signals. Specifically, the present disclosure provides a coherent detection-based high-speed chaotic secure transmission method.

A coherent detection-based high-speed chaotic secure transmission method in the present disclosure includes the following steps:

Step 1: At a transmit terminal in a chaotic secure transmission system, optically couple an optical chaotic carrier $c(t)$ and transmission information $m(t)$ by using an orthogonal basis (which may be a polarization orthogonal basis or phase orthogonal basis, but is not limited thereto), and masking the transmission information by using a noise-like feature of the chaotic carrier to obtain a chaotic masked signal $cm(t)$.

Step 2: Add a fast phase disturbance and a fast polarization disturbance to the chaotic masked signal $cm(t)$ to improve security of the chaotic masked signal; and transmit the chaotic masked signal over an optical fiber transmission link.

Step 3: The chaotic masked signal transmitted over the optical fiber may be subject to various linear and nonlinear damages, such as fiber dispersion, polarization mode dispersion, and nonlinear effects. Therefore, at a receive terminal in the chaotic secure transmission system, obtain the chaotic masked signal with intensity, phase, and polarization information through coherent detection; and compensate the chaotic masked signal after the coherent detection for linear and nonlinear effects through digital signal processing and use a polarization orthogonal basis- or phase orthogonal basis-based chaotic decryption algorithm to separate the chaotic carrier from the signal so as to complete decryption.

Using the polarization orthogonal basis-based chaotic decryption algorithm to decrypt the chaotic masked signal obtained by optically coupling the optical chaotic carrier $c(t)$ and the transmission information $m(t)$ by using the polarization orthogonal basis may be specifically implemented as follows:

(1) Polarization rotation in the link is represented by an azimuth angle θ and an ellipticity angle φ, and a test range of the azimuth angle θ and the ellipticity angle φ is first set as follows:

$$\theta, \varphi = \frac{b}{B} \cdot \frac{\pi}{2}, b \in (0, 1, 2, \ldots, B-1) \quad (1)$$

where B represents a total number of test angles, and the test range of the two angles is $-90°$ to $90°$.

(2) Each set of test angles is composed of $\theta_k$ and $\varphi_m$, and a value range of k and m is $0, 1, 2, \ldots,$ and $B-1$. Polarization tracking is performed on the chaotic masked signal by using an inverse transmission matrix $M^{-1}$ to implement chaotic decryption. The inverse transmission matrix $M^1$ is expressed as follows:

$$M^{-1}(\theta_k, \varphi_m) = \begin{bmatrix} \cos(\theta_k)\exp(j\varphi_m) & \sin(\theta_k)\exp(-j\varphi_m) \\ -\sin(\theta_k)\exp(j\varphi_m) & \cos(\theta_k)\exp(-j\varphi_m) \end{bmatrix} \quad (2)$$

The polarization tracking process is expressed as follows:

$$\begin{bmatrix} E_{outx,k,m} \\ E_{outy,k,m} \end{bmatrix} = M^{-1}(\theta_k, \varphi_m) \cdot \begin{bmatrix} E_{inx} \\ E_{iny} \end{bmatrix} \quad (3)$$

where $E_{inx}$ and $E_{iny}$ represent chaotic masked signals after the compensation for the linear and nonlinear effects; and $E_{outx,k,m}$ and $E_{outy,k,m}$ represent chaotic masked signals after the polarization rotation is performed on the test angles $\theta_k$ and $\varphi_m$ by using the inverse transmission matrix.

(3) Two-level coarse and fine steps are used to select test values of the two angles from $-90°$ to $90°$. First, a first-level coarse step of $18°$ is used to select angles within the test range, $E_{outx,k,m}$ and $E_{outy,k,m}$ are obtained, and a Godard's error is introduced to analyze signal quality and determine whether the polarization tracking decrypts the chaotic masked signal. Tests are conducted for all test angle combinations, and an optimal test angle combination ($\theta_{subopt}$, $\varphi_{subopt}$) corresponding to a smallest Godard's error is found. The optimal test angle combination ($\theta_{subopt}$, $\varphi_{subopt}$) is used to establish test ranges ($\theta_{subopt}-\delta_1$, $\theta_{subopt}+\delta_1$) and ($\varphi_{subopt}-\delta_1$, $\varphi_{subopt}+\delta_1$) with a second-level fine step, where $\delta_1$ represents the second-level fine step whose size is $3°$. Tests are conducted for all test angle combinations, and an optimal test angle combination ($\theta_{opt}$, $\varphi_{opt}$) corresponding to a smallest Godard's error is found to demodulate the chaotic masked signal. The step size in the algorithm is adjusted based on an actual situation or obtained by adopting an adaptive step size.

(4) The Godard's error of the algorithm is defined as follows:

$$\varepsilon_{outx/y,k,m} = \sum_{n=1}^{N} (\|E_{outx/y,k,m}(n)\|^2 - RP_{outx/y,k,m}), \quad (4)$$

$$RP_{outx/y,k,m} = \frac{\text{mean}(|E_{outx/y,k,m}|^4)}{\text{mean}(|E_{outx/y,k,m}|^2)}$$

where $|E_{outx/y,k,m}|^2$ represents intensity of the signals $E_{outx,k,m}$ and $E_{outy,k,m}$, N represents a number of sample points of the signal, and $RP_{outx,k,m}$ represents constant power of the signals $E_{outx,k,m}$ and $E_{outy,k,m}$.

Using the phase orthogonal basis-based chaotic decryption algorithm to decrypt the chaotic masked signal obtained by optically coupling the optical chaotic carrier c(t) and the transmission information m(t) by using the phase orthogonal basis may be specifically implemented as follows:

(1) First, compensate the chaotic masked signal received by the receive terminal for the linear and nonlinear effects, where a chaotic masked signal after the compensation is represented by $E_{inp}$. Then, perform distributed Fourier transform on the signal $E_{inp}$ to obtain spectrum information of the signal and search for a maximum peak of the spectrum to obtain initial frequency offset information $f_c$ of the signal. Finally, perform initial frequency offset compensation. A specific process is expressed as follows:

$$E_{inc} = E_{inp} \exp\{-j2\pi \max(|FFT(E_{inp})|)t\} = E_{in} \exp(-j2\pi f_c t) \quad (5)$$

(2) Perform serial-to-parallel conversion on a signal $E_{inc}$ after the initial frequency offset compensation to obtain a series of parallel data, and test a phase slope $l_f$ of the parallel data to further estimate an accurate frequency offset of the signal, so as to implement accurate frequency offset compensation of the signal. Use an average information phase of parallel data whose signal intensity is greater than a threshold $R_{th}$ to compensate for a laser phase noise disturbance. Obtain the transmission information through in-phase and quadrature (IQ) separation after the compensation to implement chaotic decryption.

Compared with the prior art, the present disclosure has the following beneficial effects:

(1) The receive terminal in the system does not need to use a hardware synchronization method, but directly uses a coherent receiving method. This can reduce a requirement of chaotic secure hardware synchronization on a device at the receive terminal.

(2) No dispersion compensation fiber or module needs to be added to the transmission link, and the signal can be directly compensated for the effects in the link through the digital signal processing at the receive terminal.

(3) Relevant information of the chaotic masked signal does not need to be predicted, and the chaotic masked signal can be directly decrypted through the digital signal processing.

(4) The present disclosure can implement high-speed and long-distance transmission and decryption of chaotic secure signals in a high-speed secure communication transmission system with a plurality of transmission services, transmission wavelengths, fiber cores, and modes.

DETAILED DESCRIPTION OF THE EMBODIMENTS

The present disclosure is further described in detail below with reference to the accompanying drawings and specific embodiments.

A coherent detection-based high-speed chaotic secure transmission method in the present disclosure includes the following steps:

Step 1: At a transmit terminal in a chaotic secure transmission system, optically couple an optical chaotic carrier c(t) and transmission information m(t) by using an orthogonal basis (which may be a polarization orthogonal basis or phase orthogonal basis, but is not limited thereto) to mask the transmission information by using a noise-like feature of the chaotic carrier, so as to obtain a chaotic masked signal cm(t).

Step 2: Add a fast phase disturbance and a fast polarization disturbance to the chaotic masked signal cm(t) to improve security of the chaotic masked signal; and transmit the chaotic masked signal over an optical fiber transmission link.

Step 3: The chaotic masked signal transmitted over the optical fiber may be subject to various linear and nonlinear damages, such as fiber dispersion, polarization mode dispersion, and nonlinear effects. Therefore, at a receive terminal in the chaotic secure transmission system, obtain the chaotic masked signal with intensity, phase, and polarization information through coherent detection; and compensate the chaotic masked signal after the coherent detection for linear and nonlinear effects through digital signal processing and use a polarization orthogonal basis- or phase orthogonal basis-based chaotic decryption algorithm to separate the chaotic carrier from the signal so as to complete decryption.

Figure 1:
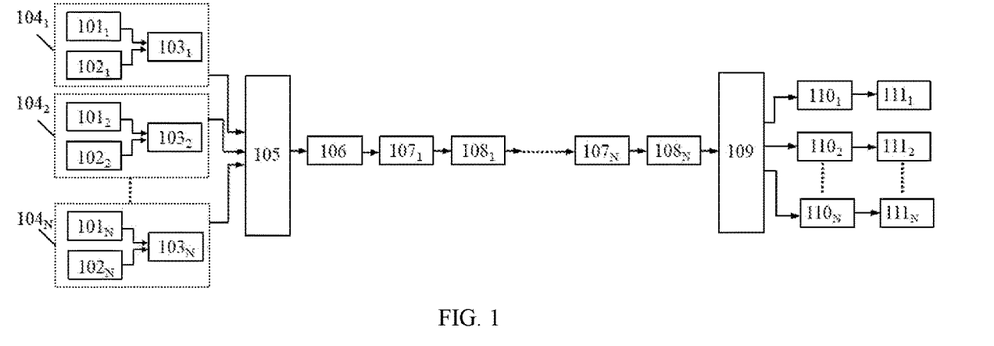
FIG. 1 is a block diagram of a coherent detection-based high-speed chaotic secure transmission method according to the present disclosure.

As shown in FIG. 1, in the present disclosure, information modulation modules ($101_1$ to $101_N$) modulate amplitude modulation OOK or m-PAM, phase modulation m-PSK, or m-QAM signals; chaotic carrier generation modules ($102_1$ to $102_N$) generate optical chaotic carriers; orthogonal basis multiplexing modules ($103_1$ to $103_N$) optically couple the optical chaotic carriers and the signals by using the orthogonal basis to obtain chaotic masked signals; the information modulation modules ($101_1$ to $101_N$), the chaotic carrier generation modules ($102_1$ to $102_N$), and the orthogonal basis multiplexing modules ($103_1$ to $103_N$) form transmitters ($104_1$ to $104_N$) for one or N channels of wavelengths (services) in the system; a wavelength division multiplexer (105) couples the to-be-transmitted signals of a plurality of wavelengths (services), and a rapid deflection apparatus (106) rapidly deflects the chaotic masked signals; the signals are transmitted over one or N segments of optical fibers ($107_1$ and $107_N$), and one or N optical amplifiers ($108_1$ to $108_N$) compensate the signals for corresponding transmission losses; a wavelength division demultiplexer (109) separates the transmitted chaotic masked signals of the plurality of wavelengths, and a coherent receiver ($110_1$ to $110_N$) performs analog-to-digital conversion on the signals to obtain digital signals; and finally, digital signal processing modules ($111_1$ to $111_N$) perform corresponding signal damage compensation and chaotic signal decryption.

Figure 2:
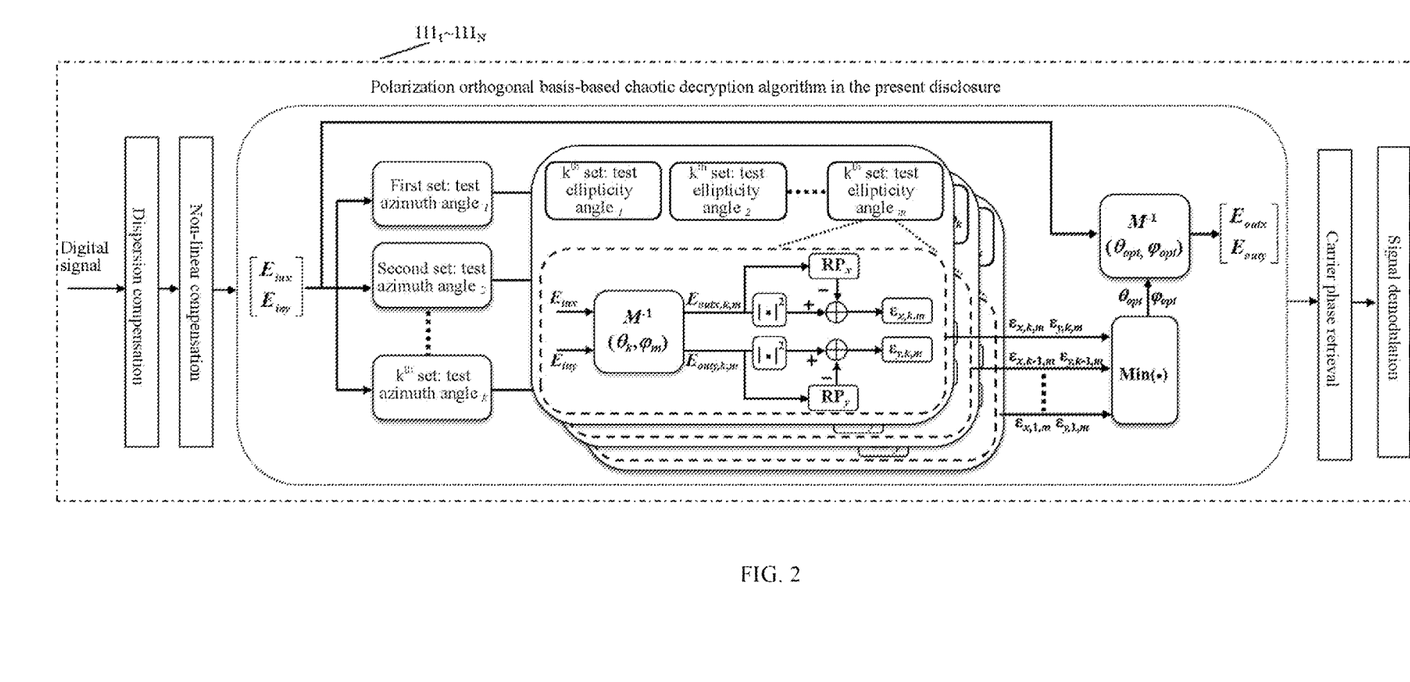
FIG. 2 is a block diagram of a polarization orthogonal basis-based chaotic decryption algorithm according to the present disclosure.

FIG. 2 is a block diagram of a polarization orthogonal basis-based chaotic decryption algorithm. The digital signal processing modules ($111_1$ to $111_N$) perform dispersion and nonlinear effect compensation on the received chaotic masked digital signals. For the compensated chaotic masked data, different combinations of test azimuth angles $\theta_k$ and test ellipticity angles $\varphi_m$ are obtained. Then, an inverse transmission matrix $M^{-1}$ is used to perform polarization tracking on the chaotic masked signals. Chaotic masked signals $E_{outx,k,m}$ and $E_{outy,k,m}$ obtained after the polarization tracking are used to calculate a Godard's error, and it is determined based on the error whether the polarization tracking decrypts the chaotic masked signals. Tests are conducted for all test angle combinations, and a smallest Godard's error is found. A test angle combination corresponding to the error is an optimal test angle combination ($\theta_{opt}$, $\varphi_{opt}$). This test angle combination can be used to decrypt the chaotic masked signals. Then, laser phase noise is compensated through carrier phase retrieval. Finally, a signal demodulation module demodulates the signals.

Figure 3:
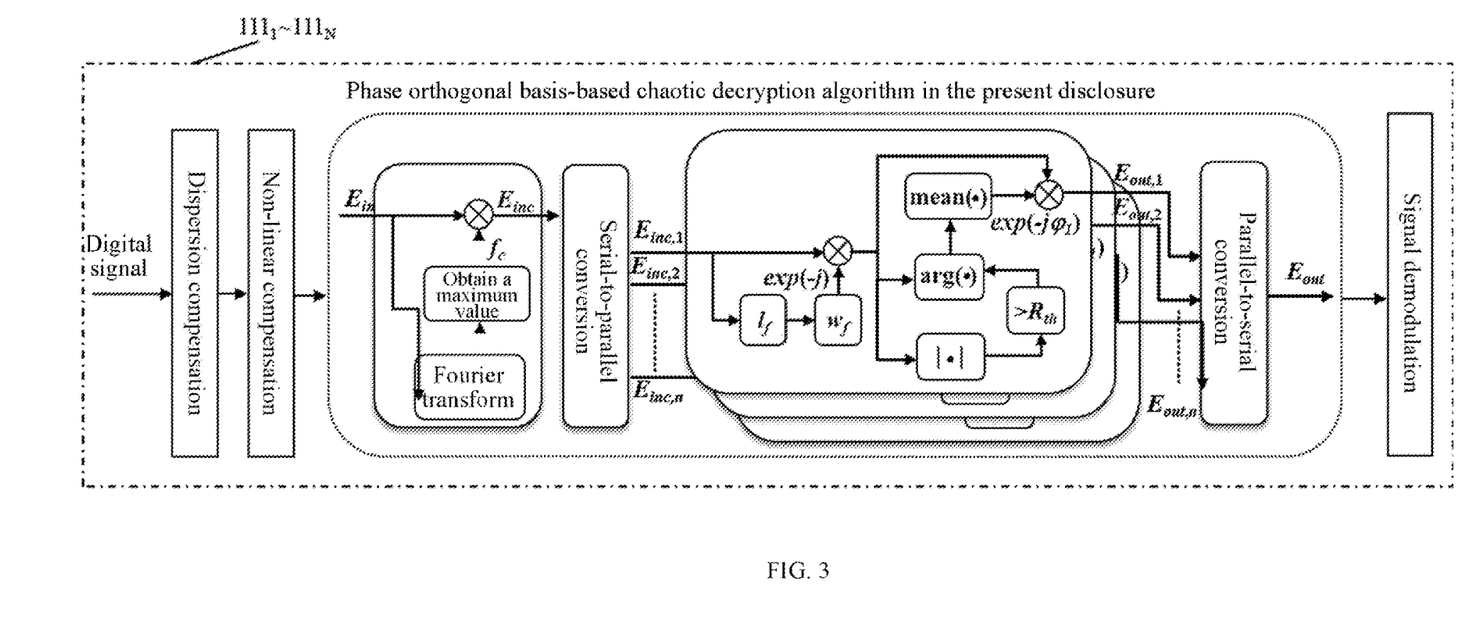
FIG. 3 is a block diagram of a phase orthogonal basis-based chaotic decryption algorithm according to the present disclosure.

FIG. 3 is a block diagram of a phase orthogonal basis-based chaotic decryption algorithm according to the present disclosure. The digital signal processing modules ($111_1$ to $111_N$) perform dispersion and nonlinear effect compensation on the received chaotic masked digital signals. First, distributed Fourier transform is performed on compensated chaotic masked data $E_{inp}$ to obtain spectrum information of the signals. Then, initial frequency offset information $f_c$ of the signals is obtained by searching for a maximum peak of the spectrum. Finally, initial frequency offset compensation is performed. Serial-to-parallel conversion is performed on signals $E_{inc}$ after the initial frequency offset compensation to obtain a series of parallel data. Phase slopes $l_f$ of the parallel data are tested to further estimate accurate frequency offsets of the signals, so as to implement accurate frequency offset compensation of the signals. Then, an average information phase of parallel data whose signal intensity is greater than a threshold $R_{th}$ is used to compensate for a laser phase noise disturbance. After the compensation, transmission information can be obtained through IQ separation to implement chaotic decryption.

Figure 4A:
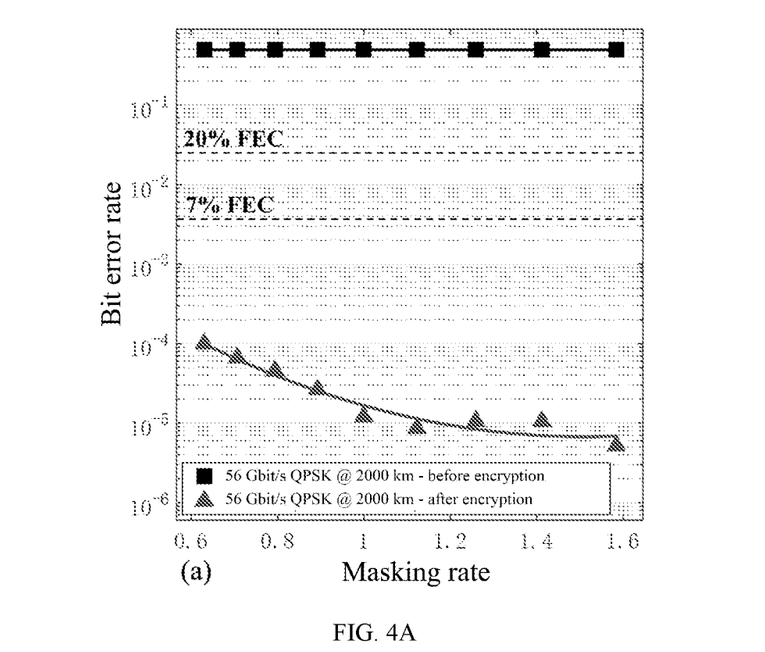
FIG. 4A shows bit error rates of a 56 Gbit/s quadrature phase shift keying (QPSK) signal (a) before and after decryption at different masking rates and FIG. 4B shows bit error rates of a 112 Gbit/s 16-quadrature amplitude modulation (QAM) signal (b) before and after decryption at different masking rates.
Figure 4B:
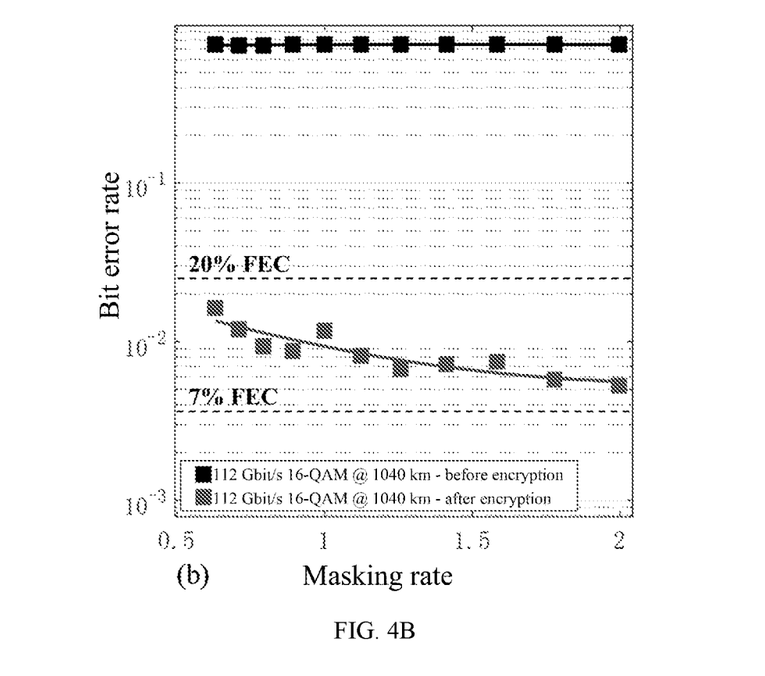

FIGS. 4A-4B show performance tests of using a polarization orthogonal basis-based chaotic decryption algorithm to decrypt chaotic masked signals obtained through coupling by using a polarization orthogonal basis in the present disclosure. FIGS. 4A-4B compare bit error rates of a 56 Gbit/s QPSK chaotic masked signal (a) and a 112 Gbit/s 16-QAM chaotic masked signal (b) before decryption with those after decryption at different masking rates. The masking rate is a ratio of an amplitude of information to an amplitude of a chaotic carrier. It can be learned from the two diagrams that the bit error rates before decryption at all masking rates are higher than 0.3. Therefore, it can be concluded that the chaotic carrier can successfully hide the signal in these two systems, and it is very difficult for an eavesdropper to directly obtain the transmission information. By using the algorithm in the present disclosure, after the 56 Gbit/s QPSK chaotic masked signal is transmitted over 2000 km, demodulation performance is still lower than a 7% forward error correction (FEC) threshold (corresponding to a bit error rate $3.8 \times 10^{-3}$). After the 112 Gbit/s 16-QAM chaotic masked signal is transmitted over 1040 km, a demodulation error bit rate of the algorithm can be lower than $2.4 \times 10^{-3}$ (corresponding to a 20% FEC threshold). It is also learned that decryption performance becomes worse as the masking rate decreases. This is mainly because a residual of chaotic cancellation is equivalent to large noise power, which directly affects the decryption performance of the algorithm in the present disclosure to some extent.

Figure 5A:
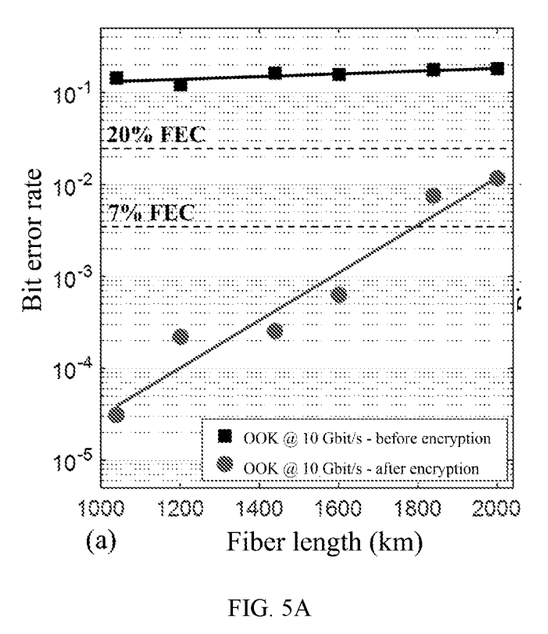
FIG. 5A shows bit error rates of a 10 Gbit/s OOK signal (a) before and after decryption over optical fibers of different lengths and FIG. 5B shows bit error rates of a 28 Gbit/s OOK signal (b) before and after decryption over optical fibers of different lengths.
Figure 5B:
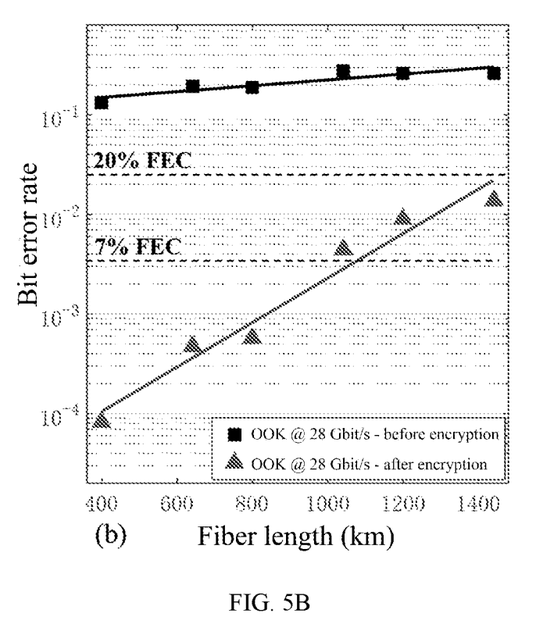

FIGS. 5A-5B show performance tests of using a phase orthogonal basis-based chaotic decryption algorithm to decrypt chaotic masked signals obtained through coupling by using a phase orthogonal basis in the present disclosure. FIGS. 5A-5B compare bit error rates of a 10 Gbit/s OOK chaotic masked signal (a) and a 28 Gbit/s OOK chaotic masked signal (b) before decryption with those after decryption over optical fibers of different lengths. It can be learned from the two diagrams that the bit error rates before decryption are higher than 0.1. It can be considered that without using the chaotic decryption algorithm in the present disclosure, it is very difficult for an eavesdropper to directly obtain the transmission information. When decryption performance is lower than the 20% FEC threshold, the 10 Gbit/s OOK chaotic masked signal and the 28 Gbit/s OOK chaotic masking signal (b) can be transmitted over 2000-km and 1440-km optical fibers, respectively. It can be observed that the decryption performance of the 28 Gbit/s OOK chaotic masked signal is much worse than that of the 10 Gbit/s OOK chaotic masked signal. This is mainly because a signal at a higher transmission rate is more sensitive to damage in an optical fiber link and more prone to damage.

What is claimed is:

1. A coherent detection-based high-speed chaotic secure transmission method, comprising the following steps:

step 1: at a transmit terminal in a chaotic secure transmission system, optically coupling an optical chaotic carrier c(t) and transmission information m(t) by using an orthogonal basis, masking the transmission information by using a noise feature of the optical chaotic carrier to obtain a chaotic masked signal cm(t);

wherein the orthogonal basis comprises at least one of a polarization orthogonal basis or a phase orthogonal basis;

step 2: transmitting the chaotic masked signal over an optical fiber transmission link; and step 3: at a receive terminal in the chaotic secure transmission system, compensating the chaotic masked signal after coherent detection for linear and nonlinear effects through digital signal processing and using a phase orthogonal basis-based chaotic decryption algorithm to separate the optical chaotic carrier from the chaotic masked signal so as to complete decryption, wherein using the phase orthogonal basis-based chaotic decryption algorithm to decrypt the chaotic masked signal obtained by optically coupling the optical chaotic carrier c(t) and the transmission information m(t) by using the phase orthogonal basis is specifically implemented as follows:

(1) first compensating the chaotic masked signal received by the receive terminal for the linear and nonlinear effects to obtain a compensated chaotic masked signal, wherein the compensated chaotic masked signal is represented by $E_{inp}$; then performing distributed Fourier transform on the compensated chaotic masked signal $E_{inp}$ to obtain spectrum information of the compensated chaotic masked signal and searching for a maximum peak of the spectrum information to obtain initial frequency offset information $f_c$ of the compensated chaotic masked signal; and finally, performing initial frequency offset compensation to obtain a signal $E_{inc}$; and (2) performing serial-to-parallel conversion on the signal $E_{inc}$ after the initial frequency offset compensation to obtain a series of parallel data, and testing a phase slope $l_f$ of the series of parallel data to further estimate an accurate frequency offset of the signal, so as to implement accurate frequency offset compensation of the signal; using an average information phase of parallel data having signal intensity greater than a threshold $R_{th}$ to compensate for a laser phase noise disturbance; and obtaining the transmission information through in-phase and quadrature (IQ) separation after the compensation to implement chaotic decryption.

* * * * *